United States Patent
Lin

(10) Patent No.: US 10,313,624 B2
(45) Date of Patent: Jun. 4, 2019

(54) DISPLAY SYSTEM CAPABLE OF DISPLAYING A PICTURE-IN-PICTURE IMAGE BY STACKING IMAGES

(71) Applicant: BENQ CORPORATION, Taipei (TW)

(72) Inventor: Hsin-Nan Lin, Taipei (TW)

(73) Assignee: BenQ Corporation, Taipei (TW)

(*) Notice: Subject to any disclaimer, the term of this patent is extended or adjusted under 35 U.S.C. 154(b) by 0 days.

(21) Appl. No.: 15/952,208

(22) Filed: Apr. 12, 2018

(65) Prior Publication Data

US 2018/0316887 A1   Nov. 1, 2018

(30) Foreign Application Priority Data

Apr. 28, 2017   (CN) .......................... 2017 1 0291100

(51) Int. Cl.
| | |
|---|---|
| *H04N 5/45* | (2011.01) |
| *G06F 3/14* | (2006.01) |
| *G09G 5/14* | (2006.01) |
| *G06F 3/0489* | (2013.01) |
| *H04N 21/431* | (2011.01) |
| *G09G 5/00* | (2006.01) |

(52) U.S. Cl.
CPC ............ *H04N 5/45* (2013.01); *G06F 3/0489* (2013.01); *G06F 3/14* (2013.01); *G06F 3/1454* (2013.01); *G09G 5/14* (2013.01); *H04N 21/4316* (2013.01); *G09G 5/006* (2013.01); *G09G 2340/12* (2013.01); *G09G 2370/20* (2013.01); *G09G 2370/24* (2013.01)

(58) Field of Classification Search
CPC .... H04N 5/45; H04N 21/4316; G06F 3/0489; G06F 3/1454

USPC ......................................................... 348/565
See application file for complete search history.

(56) References Cited

U.S. PATENT DOCUMENTS

| | | | |
|---|---|---|---|
| 6,873,333 B1 * | 3/2005 | Patel | G06T 1/00 345/156 |
| 2003/0001966 A1 | 1/2003 | Matsubara | |
| 2003/0174144 A1 * | 9/2003 | Lin | G09G 5/397 345/600 |
| 2004/0015980 A1 * | 1/2004 | Rowen | G06F 11/321 719/310 |

(Continued)

FOREIGN PATENT DOCUMENTS

| | | |
|---|---|---|
| EP | 3 121 733 A1 | 1/2017 |
| TW | I430219 B | 3/2014 |
| TW | I525439 B | 3/2016 |

*Primary Examiner* — Michael Lee

(57) ABSTRACT

A display system includes a first computer, a display device, and a control device. The first computer includes a first processor and a first memory coupled to the first processor. The first memory includes a first software package and at least one first application program controlled by the first processor through the first software package. The display device is coupled to the first computer for displaying an image. The control device is coupled to the first computer through a multiplexer. After the first computer is triggered by a hotkey, the first processor controls the at least one first application program and the multiplexer for driving the display device to display the image. The image displayed on the display device includes a first image corresponding to the first computer and a second image corresponding to the control device. The second image is stacked on the first image.

17 Claims, 4 Drawing Sheets

(56) References Cited

U.S. PATENT DOCUMENTS

2005/0275641 A1* 12/2005 Franz .................... G09G 5/006
                                                    345/204
2012/0314133 A1   12/2012 Kim
2017/0103731 A1    4/2017 Hsieh

* cited by examiner

DISPLAY SYSTEM CAPABLE OF DISPLAYING A PICTURE-IN-PICTURE IMAGE BY STACKING IMAGES

BACKGROUND OF THE INVENTION

1. Field of the Invention

The present invention illustrates a display system, and more particularly, a display system capable of displaying a picture-in-picture image by stacking images.

2. Description of the Prior Art

With advancement of computer technologies, various powerful processors and displays are also used for providing different sight and sound effects or visual experiences to users. For example, game software and video player software can be installed in a computer. The computer can be linked to a game-specific joystick or a keyboard for facilitating user-to-machine intersections, thereby improving satisfactory visual and audio experiences. Nowadays, since the display is designed to provide high computational capability, various media parameters can be used in the display for providing fine-tuned functions in order to adjust displayed images or sound effects. When a user uses a computer for playing a video game, the user can adjust some media parameters or configurations for enhancing audio and video qualities. For example, when the user uses the computer for playing the video game, a control interface displayed on a screen can be used for increasing contrast of the displayed image or adjusting a sound equalizer in order to increasing gains of bass sound, leading to enhanced sound and light effects.

When the computer generates a video stream, if the user wants to use the control interface for adjusting some media parameters, the video stream generated by the computer may be interrupted. For example, when the user uses the computer for playing the video game, game images may be lagged or delayed because the control interface is generated, reducing fluency of the game. In another case, when the user uses the computer for displaying a full-screen video, an image of the full-screen video may be resized to a window image because the control interface is generated. Therefore, after the user adjusts the parameters through the control interface, the user has to enlarge the window image to the full-screen image again, reducing quality of the visual experience.

SUMMARY OF THE INVENTION

In an embodiment of the present invention, a display system capable of displaying a picture-to-picture image is disclosed. The display system comprises a first computer, a display device, and a control device. The first computer comprises a first processor and a first memory coupled to the first processor. The first memory comprises a first software package and at least one first application program controlled by the first processor through the first software package. The display device is coupled to the first computer and configured to display an image. The control device is coupled to the first computer through a multiplexer. After the first computer is triggered by a hotkey, the first processor controls the at least one first application program and the multiplexer through the first software package for driving the display device to display the image. The image displayed on the display device comprises a first image corresponding to the first computer and a second image corresponding to the control device. The second image is stacked on the first image.

In another embodiment of the present invention, a display system capable of displaying a picture-to-picture image is disclosed. The display system comprises a computer, a multiplexer, a display device, and a control device. The computer comprises a first processor, a second processor, and a first memory coupled to the first processor and the second processor. The first memory comprises a first software package, a second software package, at least one first application program controlled by the first processor through the first software package, and at least one second application program controlled by the second processor through the second software package. The multiplexer is coupled to the first processor and the second processor. The display device is coupled to the computer and configured to display an image. The control device is coupled to the multiplexer. When the computer is triggered by a hotkey, the first processor controls the at least one first application program and the multiplexer through the first software package so as to establish a link between the control device and the second processor through the multiplexer. The image displayed on the display device comprises a first image generated by the first processor and a second image generated by the second processor. The second image is stacked on the first image.

In another embodiment of the present invention, a display system capable of displaying a picture-to-picture image is disclosed. The display system comprises a first computer, a second computer, a display device, and a control device. The first computer comprises a first processor and a first image generator coupled to the first processor and configured to generate a first image. The second computer comprises a second processor and a second image generator coupled to the second processor and configured to generate a second image. The display device is coupled to the first computer and the second computer. The control device is coupled to the first computer through a multiplexer. The display device initially displays the first image. After the first computer is triggered by a hotkey, the first computer controls the multiplexer to establish a link between the control device and the second computer. The display device displays the first image and the second image simultaneously. The second computer operates the second image through the control device and generates a control signal to the first computer accordingly. The first computer controls the display device according to the control signal.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
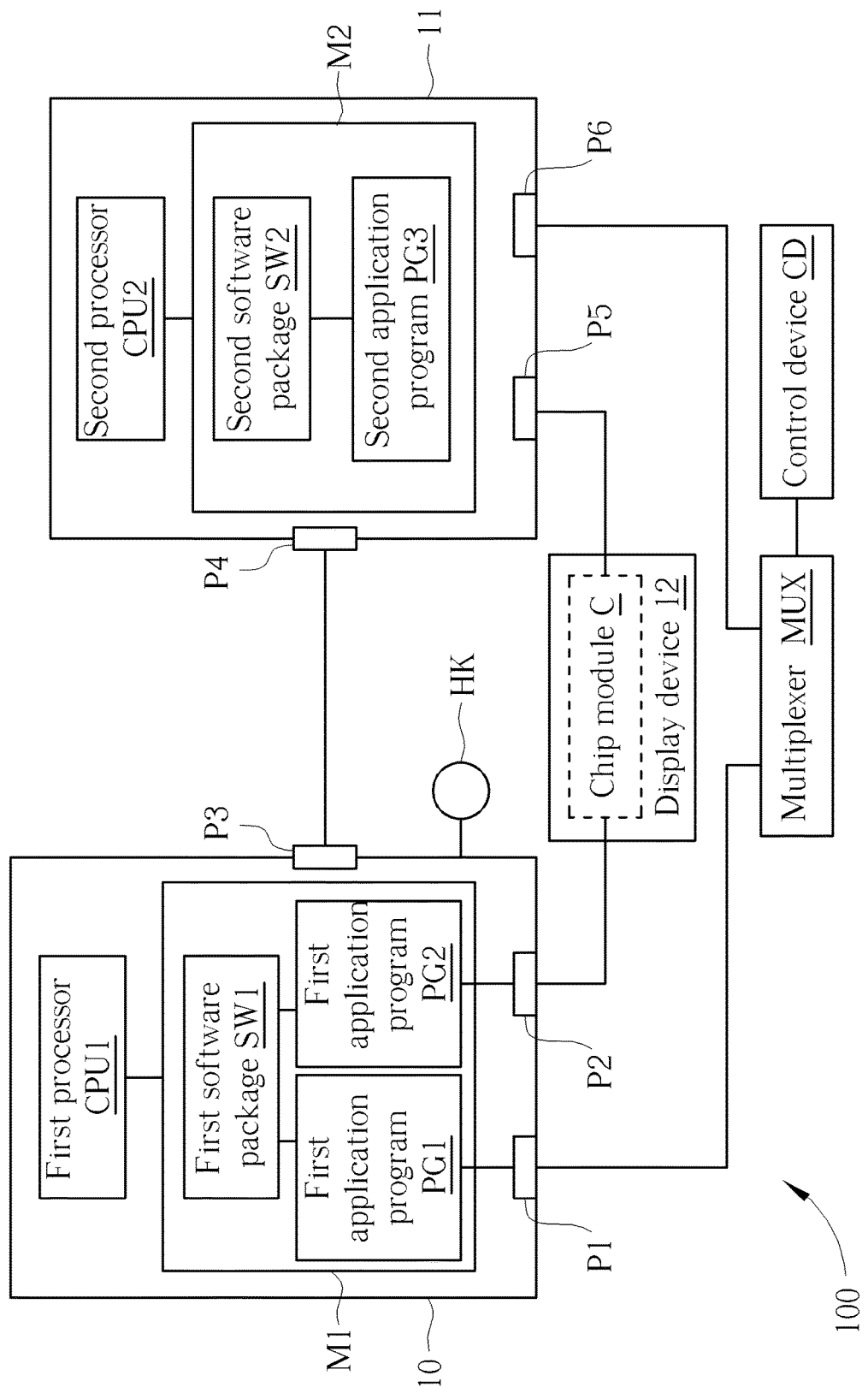
FIG. 1 is a block diagram of a display system according to an embodiment of the present invention.

FIG. 1 is a block diagram of a display system 100 according to the embodiment of the present invention. The display 100 includes a first computer 10, a second computer 11, a display device 12, a multiplexer MUX, and a control device CD. The first computer 10 can be any device capable of installing and executing application programs, such as a notebook, a desktop computer, a tablet, or a work station. The first computer 10 includes a first processor CPU1 and a first memory M1. The first processor CPU1 can be a central processing unit, a microprocessor, a processing chip, or a programmable logic unit. The first memory M1 can be a random access memory (RAM), a non-volatile memory, or a hard disk. The first processor CPU1 is coupled to the first memory M1. The first memory M1 includes a first software package SW1 and at least one first application program controlled by the first processor CPU1 through the first software package SW1. For example, two first application programs PG1 and PG2 can be saved in the first memory M1. The first software package SW1 can be installed in the first memory M1. The first application program PG1 can be a device control application program. The first application program PG2 can be a chip application program. The first computer 10 can further include a plurality of connection ports, such as a port P1 to a port P3. The port P1 to port P3 can be wired or wireless connection ports. The second computer 11 can also be any device capable of installing and executing application programs. The second computer 11 is coupled to the first computer 10. The second computer 11 includes a second processor CPU2 and a second memory M2. The second processor CPU2 can also be a central processing unit, a microprocessor, a processing chip, or a programmable logic unit. The second memory M2 can also be a random access memory, a non-volatile memory, or a hard disk. The second processor CPU2 is coupled to the second memory M2. The second memory M2 includes a second software packet SW2 and at least one second application program controlled by the second processor CPU2 through the second software packet SW2. For example, a second application program PG3 can be saved in the second memory M2. The second software packet SW2 can be installed in the second memory M2. The second application program PG3 can be an operating system (OS) shutdown application program. Similarly, the second computer 11 can further include a plurality of connection ports, such as a port P4 to a port P6. The port P4 to port P6 can be wired or wireless connection ports. The display device 12 can be any type of display, such as a liquid crystal display or a plasma display. The display device 12 includes a chip module C (i.e., a scalar). The chip module C is coupled to the first computer 10 and the second computer 11. The chip module C can be driven by the first application program PG2 (i.e., the chip application program). The display device 12 can be used for displaying images. The multiplexer MUX is coupled to the first computer 10 and the second computer 11. The multiplexer MUX can be a signal selector. The control device CD can be an input device for inputting external signals, such as a mouse, a keyboard, or a joystick. The control device CD is coupled to the multiplexer MUX. The display system 100 can further include a hot key HK. The hotkey HK can be a physical key device coupled to the first computer 10. The hotkey HK can also be a virtual key of the image displayed on the display device 12. In the display system 100, when the first computer 10 is triggered by the hot key HK, the first processor CPU1 controls at least one first application program (i.e., PG1) and the multiplexer MUX through the first software packet SW1. Then, the control device CD can be linked to the second computer 11 through the multiplexer MUX. After the control device CD is linked to the second computer 11 through the multiplexer MUX, the control device CD can control the second computer 11. Further, the first computer 10 can generate a first image. The second computer 11 can generate a second image. In other words, the image displayed by the display device 12 includes the first image corresponding to the first computer 10 and the second image operated by the control device CD. For example, the first image can be a background image. The second image can be a control interface image. The background image and the control interface image can be displayed on the display device 12 in form of a picture-in-picture image. The user can operate the control device CD for adjusting different media parameters through the control interface image.

In the display system 100, the port P3 and the port P4 can be used for establishing a link between the first computer 10 and the second computer 11. The port P1 and port P6 can be used for connecting to the multiplexer MUX. The port P2 and the port P5 can be used for connecting to the display device 12. After the hotkey HK of the first computer 10 is triggered, the first computer 10 can use the first software packet SW1 for transmitting a command to the display device 12 through a digital display channel (DDC/CI). The first computer 10 can also control the multiplexer MUX by using the first software packet SW1 through an inter-integrated circuit ($I^2C$) bus or a general-purpose input/output (GPIO) port of a motherboard. Further, the first computer 10 can generate a first image and then transmit the first image to the display device 12 through the port P2. The second computer 11 can generate the second image and then transmit the second image to the display device 12 through the port P5. Then, the display device 12 can generate the picture-in-picture image, which includes the first image (i.e., the background image) and the second image (i.e., the control interface image). Particularly, the picture-in-picture image can be formed by stacking the second image on the first image. In the following, a method for stacking the second image on the first image of the display system 100 is illustrated.

Figure 2:
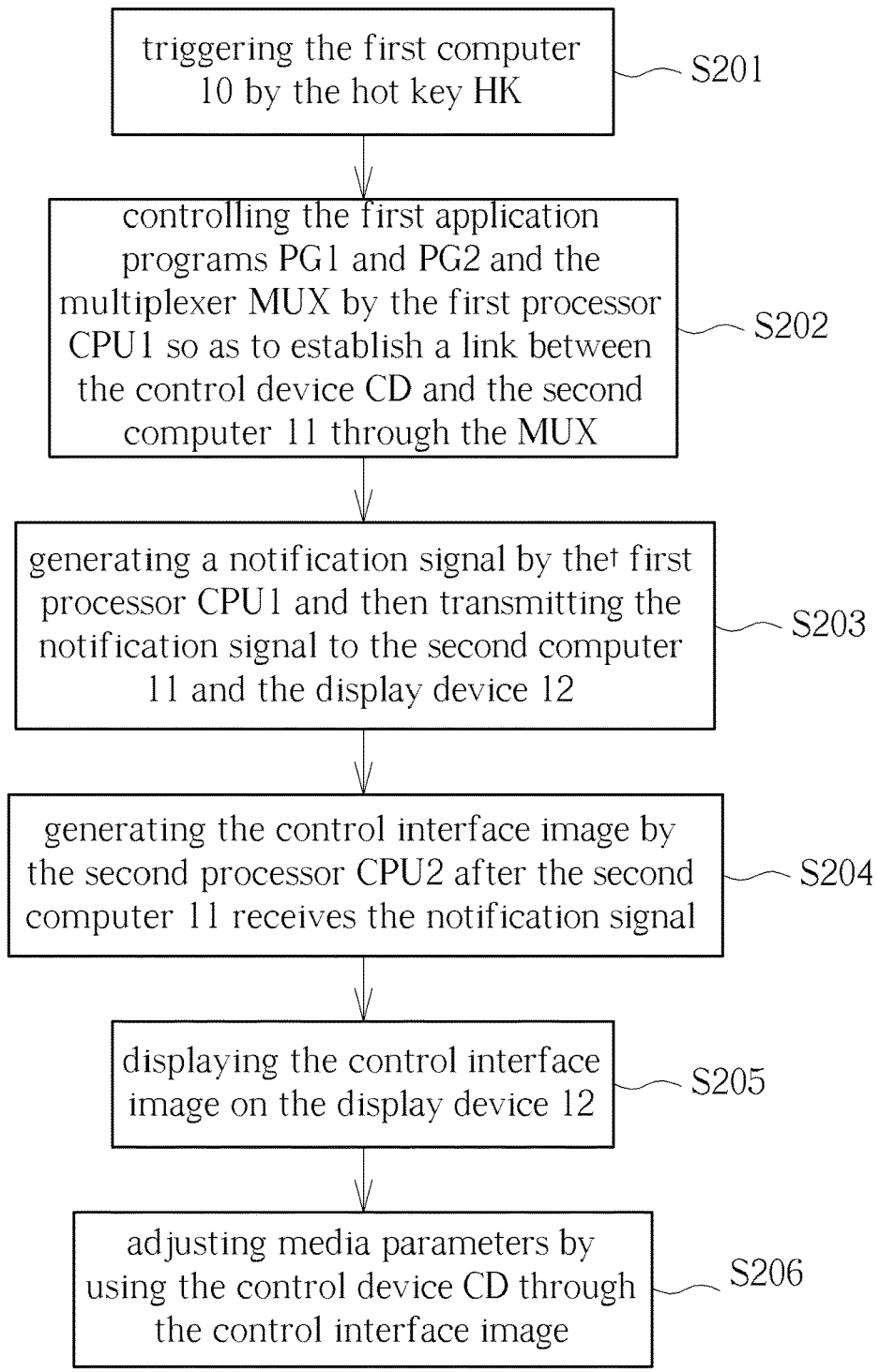
FIG. 2 is a flow chart of a method for displaying a second image of the display system in FIG. 1.

FIG. 2 is a flow chart of a method for displaying the second image of the display system 100. As mentioned previously, the second image can be the control interface image generated by the second computer 12. The method for displaying the second image includes step S201 to step S206. Any reasonable modification of step S201 to step S206 falls into the scope of the present invention. Step S201 to step S206 are illustrated below.

step S201: triggering the first computer 10 by the hot key HK;

step S202: controlling the first application programs PG1 and PG2 and the multiplexer MUX by the first processor CPU1 so as to establish a link between the control device CD and the second computer 11 through the MUX;

step S203: generating a notification signal by the first processor CPU1 and then transmitting the notification signal to the second computer 11 and the display device 12;

step S204: generating the control interface image by the second processor CPU2 after the second computer 11 receives the notification signal;

step S205: displaying the control interface image on the display device 12;

step S206: adjusting media parameters by using the control device CD through the control interface image.

In the embodiment, the first image is generated by the first computer 10 before the second image (i.e., the control interface image) is generated by using step S201 to step S206. For example, a video game can be installed in the first computer 10. The first computer 10 can generate game images so that the user can use the first computer 10 for playing the video game. The game images can be displayed on the display device 12 and can be regarded as a background image. When the user wants to adjust media parameters of the video game or display configurations, the user can use the hotkey HK for triggering the first computer 10 in order to start a configuration process in step S201. As previously mentioned, the hot key HK can be a physical button or physical key disposed on a computer table and is coupled to the first computer 10. The hotkey HK can also be a virtual key displayed on the display device 12. The hotkey HK can also be disposed on the control device CD. In the following, in step S202, the first processor CPU1 of the first computer 10 controls the first application programs PG1 and PG2 and the multiplexer MUX through the first software package SW1 so as to establish the link between the control device CD and the second computer 11 through the multiplexer MUX. In other words, the control device CD is initially used for controlling the first computer 10, such as a game console. After the first computer 10 is triggered by the hot key HK, the control device CD can be switched for controlling the second computer 11. Further, a control switching operation of the control device CD can be executed by using the first software packet SW1 of the first computer 10. In step S203, the first processor CPU1 of the first computer 10 can generate the notification signal and then transmit the notification signal to the second computer 11 and the display device 12. For example, the first computer 10 can use the first software packet SW1 for transmitting a command to the display device 12 through a digital display channel (DDC/CI). Next, in step S204, after the second computer 11 receives the notification signal, the second processor CPU2 can generate the control interface image. In step S205, the display device 12 can display the control interface image. Here, the second computer 11 can transmit the control interface image to the display device 12 through the port P5. In the embodiment, the display device 12 continuously displays the first image (i.e., the background image of the game screen). However, after the display control interface image is generated, the background image displayed on the display device 12 is not interrupted. In other words, the background image displayed on the display device 12 and the control interface image are continuously operated over time without introducing mutual interference or interruption since they are generated separately. Finally, in step S206, since the display device 12 displays the control interface image, the user can use the control device CD for adjusting the media parameters through the control interface image. For example, when the user wants to adjust the media parameters of the display device 12, he/she can directly adjust the media parameters displayed on the control interface image. After the user adjusts the media parameters displayed on the control interface image, the adjusted media parameters of the control interface image can be converted into electrical signals and then transmitted from the second computer 11 to the first computer 10 through the port P4 and the port P3. After the first computer 10 receives the electrical signals corresponding to the adjusted parameters, the first computer 10 can control the display device 12 by using the first application program PG2.

In the present invention, the first image can be the background image. The second image can be the control interface image. However, the present invention is not limited thereto. For example, any picture-in-picture image generated by superimposing or stacking the second image on the first image falls into the scope of the present invention. After the picture-in-picture image is generated, the first image and the second image can be continuously operated over time. For example, the first image can be a full-screen movie image. The second image can be a pop-up window of an instant message generated by an external hotkey or signal. After the second image is generated, the first image can remain in a full-screen display mode. Further, the second image can be stacked on the first image. Additionally, as previously mentioned, after the first computer 10 is triggered by the hotkey HK, the control device CD can control the second computer 11. By doing so, the second image generated by the second computer 11 can be operated by the control device CD. At the moment, the first image cannot be operated by the control device CD.

As previously mentioned, any reasonable modification in step S201 to step S206 falls into the scope of the present invention. For example, a shutdown signal or a power off signal can be generated by the first computer 10. The shutdown signal or the power off signal can be transmitted from the first computer 10 to the second computer 11. After the second computer 11 receives the shutdown signal or the power off signal, the second processor CPU2 can turn off its power by the second application program PG3 through the second software package SW2. The second application program PG3 can be an operating system (OS) shutdown application program, such as a "Linux Power Off" application program. The first software package SW1 of the first computer 10 is capable of controlling a plurality of application programs. For example, the first software package SW1 can control a device control application program (i.e., the first application program PG1 for operating switching control of a mouse or a keyboard) for driving the control device CD and/or the multiplexer MUX. The first software package SW1 can control a chip application program (i.e., the first application program PG2) for driving the chip module C of the display device 12. In the embodiment, the first software package SW1 can also control the chip application program for adjusting at least one media parameter of the displayed image. The at least one media parameter can include an image brightness parameter, an image contrast parameter, an image display mode parameter, or an output voice intensity parameter.

Figure 3:
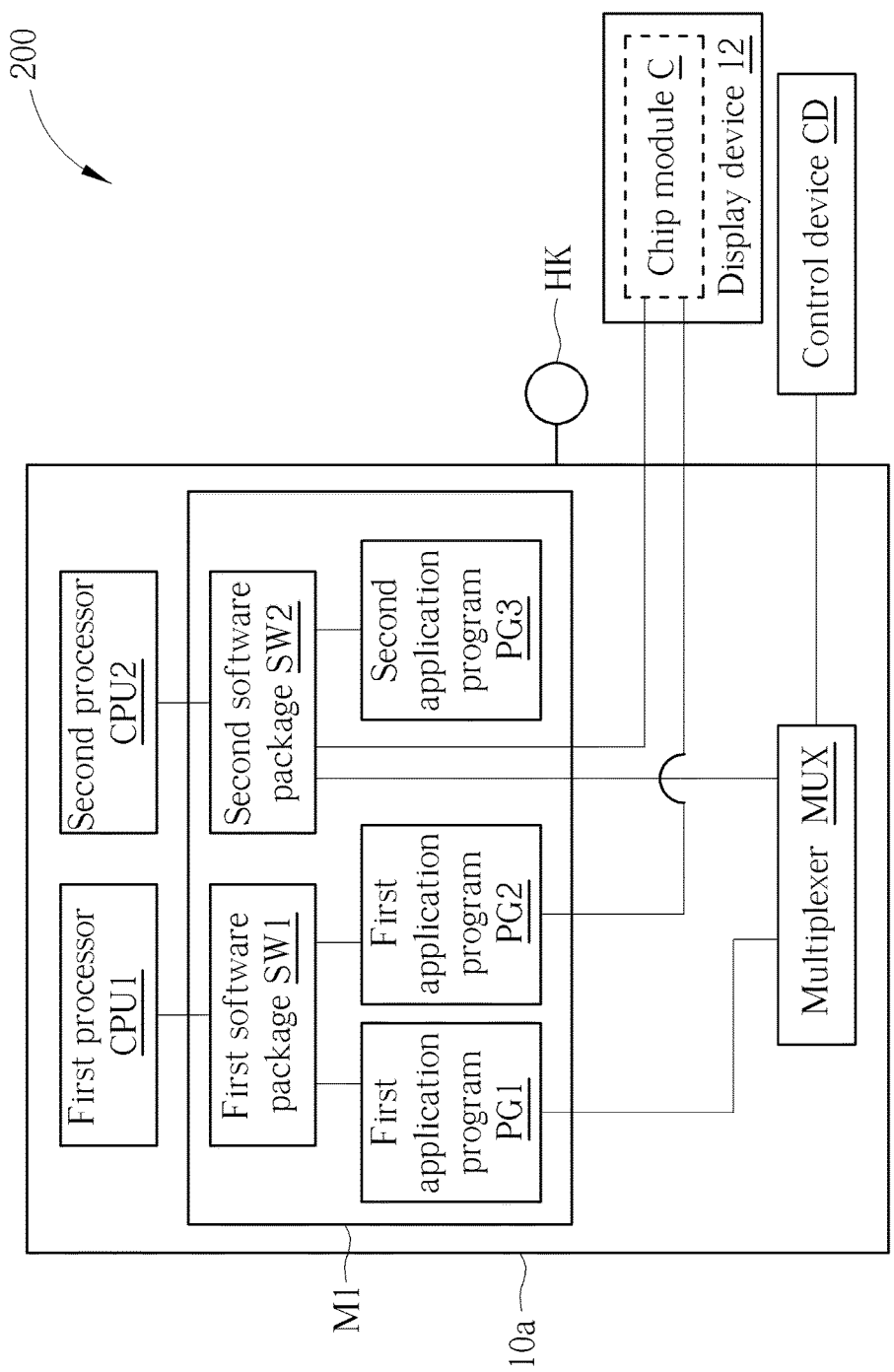
FIG. 3 is a block diagram of a display system according to another embodiment of the present invention.

FIG. 3 is a block diagram of a display system 200 according to another embodiment of the present invention. As previously mentioned, in the display system 100, the first computer 10 and the second computer 11 can be two separate computers. The first image and the second image can be respectively generated by the first computer 10 and the second computer 11. Therefore, no mutual interference is introduced to the first image and the second image. However, some components inside the second computer 11 can be integrated to the first computer 10 for reducing hardware space requirement. For avoiding ambiguity, a first computer in FIG. 3 is denoted as 10a. The display system 200 includes the first computer 10a, a display device 12, and a control device CD. Further, a multiplexer MUX can be disposed inside the first computer 10a. The multiplexer MUX can be disposed outside the first computer 10a. The first computer 10a includes a first processor CPU1, a second processor CPU2, and a first memory M1. The first memory M1 is coupled to the first processor CPU1 and the second processor CPU2. The first memory M1 includes a first software package SW1, a second software package SW2, at least one first application program (PG1 and PG2) controlled by the first processor CPU1 through the first software package SW1, and at least one second application program (PG3) controlled by the second processor CPU2 through the second software package SW2. The multiplexer MUX is coupled to the first processor CPU1 and the second processor CPU2. The first processor CPU1 can control the multiplexer MUX by using the first software package SW1. The display device 12 is coupled to the first computer 10a for displaying an image. The control device CD is coupled to the multiplexer MUX. Circuit components of the display system 200 are similar to circuit components of the display system 100. Particularly, the display system 200 can be structured by integrating the second processor CPU2, the second software package SW2, and the second application program PG3 of the second computer 11 in the aforementioned embodiment (i.e., the display system 100) into the first computer 10a. Therefore, after the first computer 10a is triggered by a hotkey HK (i.e., a physical or virtual key), the first processor CPU1 can control the at least one first application program (PG1 and PG2) and the multiplexer MUX through the first software package SW1 so as to establish a link between the control device CD and the second processor CPU2 through the multiplexer MUX. The display device 12 includes a chip module C. The chip module C is coupled to the first processor CPU1 and the second processor CPU2 through the first memory M1. Similarly, the image displayed on the display device 12 includes a first image generated by the first processor CPU1 and a second image generated by the second processor CPU2. Further, the first image can be a background image. The second image can be a control interface image. The background image and the control interface image can be displayed on the display device 12 in form of a picture-in-picture image. Further, the first image and the second image displayed on the display device 12 can be continuously operated over time. In other words, when the first image (i.e., the background image) is displayed on the display device 12 and the second image (i.e., the control interface image) is generated, the second image can be stacked on the first image. Therefore, the first image and the second image can be continuously displayed and operated without introducing mutual interference or interruption, leading to satisfactory visual experience.

Operations of the display system 200 are similar to operations of the display system 100. Thus, they are omitted here. Similarly, after the first computer 10a is triggered by the hotkey HK, the control device CD can control media parameters displayed on the second image. At the moment, the first image cannot be controlled by the control device CD. Further, in the display system 200, the first processor CPU1 can generate a shutdown signal and then transmit the shutdown signal to the second processor CPU2. After the second processor CPU2 receives the shutdown signal, the second processor CPU2 is turned off by using the second application program PG3 through the second software package SW2. By doing so, additional power consumption can be reduced by using the shutdown signal.

In the embodiments of the present invention, data communications of the display system 100 and the display system 200 can be implemented by any reasonable hardware combinations. Further, any picture-in-picture image generated by superimposing or stacking the second image on the first image falls into the scope of the present invention. For example, the first image can be defined as the background image. The second image can be defined as the control interface image. After the first computer 10a is triggered by the hotkey HK, the first processor CPU1 can generate a notification signal to the second processor CPU2 and the display device 12. After the second processor CPU2 receives the notification signal, the second processor CPU2 generates the control interface image. The display device 12 can display the control interface image. The control device CD can adjust media parameters through the control interface image. Further, the first image can be any background image, such as a full-screen movie image. The second image can be any control interface image, such as the pop-up window of the instant message generated by the external hotkey or signal. After the second image is generated, the first image can remain in a full-screen display mode. Further, the second image can be stacked on the first image. In the embodiment, since the first image and the second image can be separately generated and then stacked to form the picture-in-picture image displayed on the display device 12, no mutual interference is introduced to the first image and the second image. For example, when the user uses the first computer 10a for playing the video game, even the control interface is generated, lagged or delayed game images can be avoided. Therefore, the display system 100 and the display system 200 can improve visual experience.

Figure 4:
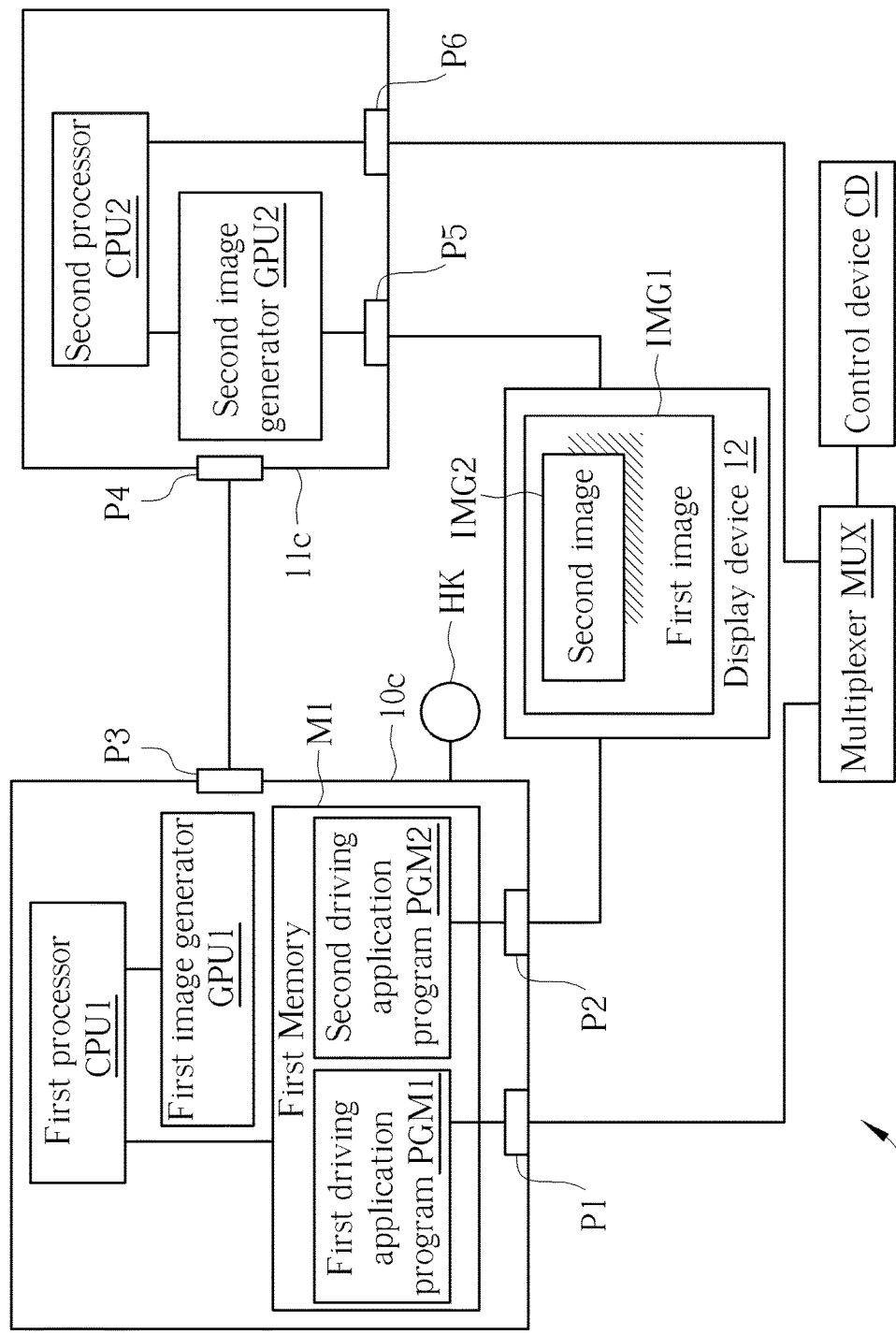
FIG. 4 is a block diagram of a display system according to another embodiment of the present invention.

FIG. 4 is a block diagram of a display system 300 according to another embodiment of the present invention. As previously mentioned, any reasonable hardware/software modification falls into the scope of the present invention. Circuit components of the display system 300 are similar to circuit components of the display system 100. Particularly, a first image generator GPU1 and a second image generator GPU2 can be introduced to the display system 300. A first driving application program PGM1 and a second driving application program PGM2 can be introduced to the display system 300 for driving corresponding hardware circuits. For avoiding ambiguity, a first computer in the display system 300 is denoted as 10c. The second computer in the display system 300 is denoted as 11c. The display system 300 includes the first computer 10c, the second computer 11c, the display device 12, and the control device CD. The first computer 10c includes the first processor CPU1 and the first image generator GPU1 coupled to the first processor CPU1. The first processor CPU1 can control the first image generator GPU1 for generating the first image IMG1. The second computer 11c includes the second processor CPU2 and the second image generator GPU2 coupled to the second processor CPU2. The second processor CPU2 can control the second image generator GPU2 for generating the second image IMG2. In the embodiment, the first image generator GPU1 and the second image generator GPU2 can be two image chips embedded in two graphic cards or a single graphic card. The first computer 10c can further include a first memory M1 coupled to the first processor CPU1. The first memory M1 includes the first driving application program PGM1 and the second driving application program PGM2. In the display system 300, the first driving application program PGM1 and the second driving application program PGM2 can be two separately installed application programs. However, the first driving application program PGM1 and the second driving application program PGM2 can also be two sub-application programs operated under an upper software layer. For example, the first driving application program PGM1 can be generated by integrating a first software package SW1 (i.e., upper layer, as shown in the display system 100) to a first application program PG1 (i.e., lower layer, as shown in the display system 100). The second driving application program PGM2 can be generated by integrating the first software package SW1 to a first application program PG2. However, any subroutine correlation between the upper layer software package (i.e., SW1) and the lower layer application programs (i.e., PG1 and PG2) can be used for performing the first driving application program PGM1 and the second driving application program PGM2. Any reasonable hardware or software combination falls into the scope of the present invention. The display device 12 is coupled to the first computer 10c and the second computer 11c. The display device 12 can display the first image IMG1. As previously mentioned, the background image initially displayed on the display device 12 is the first image IMG1 before the first computer 10c is triggered by the hotkey HK. The control device CD is coupled to the first computer 10c through the multiplexer MUX.

After the first computer 10c is triggered by the hotkey HK, the control device CD is coupled to the second computer 11c through the multiplexer MUX. Then, the display device 12 can display the first image IMG1 and the second image IMG2 simultaneously. The user can use the control device CD for operating the second image IMG2 through the second computer 11c. For example, when the user wants to adjust the media parameters of the display device 12, he/she can directly adjust the media parameters displayed on the second image IMG2 (i.e., the control interface image). After the user adjusts the media parameters, the second computer 11c can generate a control signal and then transmit the control signal to the first computer 10c through a port P4 and a port P3. After the first computer 10c receives the control signal, the first processor CPU1 can drive the display device 12 by using the second driving application program PGM2 for displaying an image corresponding to user's configurations. In other words, the control signal can be used for adjusting the media parameters of the displayed image of the video stream. Further, as previously mentioned, after the first computer 10c is triggered by the hotkey HK, the control device CD can be linked to the second computer 11c through the multiplexer MUX. In other words, after the first computer 10c is triggered by the hotkey HK, the first processor CPU1 of the first computer 10c can control the multiplexer MUX to establish a link between the control device CD and the second computer 11c through the multiplexer MUX by using the first driving application program PGM1. Therefore, the control device CD can control the second computer 11c. The user can operate the second computer 11c through the control device CD. By doing so, a control switching operation of the control device CD can be executed. Therefore, the second image IMG2 generated by the second computer 11c can be operated by the control device CD. The first image IMG1 generated by the first computer 10c cannot be controlled by the control device CD.

Similarly, the first image IMG1 generated by the first image generator GPU1 of the first computer 10c can be defined as the background image. The second image IMG2 generated by the second image generator GPU2 of the second computer 11c can be defined as the control interface image. The first image IMG1 and the second image IMG2 can be separately generated and then stacked to form the picture-in-picture image displayed on the display device 12. Further, as shown in FIG. 4, the second image IMG2 can be stacked (or say, superimposed) on the first image IMG1. Since the first image IMG1 and the second image IMG2 can be separately generated, no mutual interference is introduced to the picture-in-picture image formed by the first image IMG1 and the second image IMG2. For example, when the first image IMG1 is a full-screen image, even the second image IMG2 is generated, unexpected operations such as resizing the full-screen image to a window image can be avoided. Therefore, visual experience can be improved.

To sum up, the present invention discloses a display system capable of generating a first image and a second image separately. The display system can stack the second image on the first image for generating a picture-in-picture image. Since no mutual interference is introduced to the picture-in-picture image formed by the first image and the second image, unexpected operations such as resizing the full-screen image (i.e., the first image) to a window image or introducing timing delay of refreshing the first image can be avoided. Further, a control switch operation of the control device can be introduced to the display system. The first computer can be initially controlled by the control device before the first computer is triggered by a hotkey. For example, the user can use a mouse device for playing a video game installed in the first computer. After the first computer is triggered by the hotkey, the first computer requests a second computer for generating the second image. At the moment, the second computer can be controlled by the control device. For example, when the user wants to adjust media parameters by using a control interface while playing video game, he/she can use the hotkey for notifying another computer to generate the control interface in order to adjust the media parameters. Therefore, since the display system of the present invention is capable of fluently displaying the picture-in-picture image in conjunction with performing the control switch operation of the control device, operation efficiency and visual experience can be improved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A display system capable of displaying a picture-to-picture image comprising:
    a first computer comprising:
        a first processor; and
        a first memory coupled to the first processor, comprising:
            a first software package; and
            at least one first application program controlled by the first processor through the first software package;
    a display device coupled to the first computer and configured to display an image;
    a control device coupled to the first computer through a multiplexer; and
    a second computer coupled to the first computer, the display device, and the multiplexer, the second computer comprising:
        a second processor; and
        a second memory coupled to the second processor, comprising:
            a second software package; and
            at least one second application program controlled by the second processor through the second software package;
    wherein after the first computer is triggered by a hotkey, the first processor controls the at least one first application program and the multiplexer through the first software package for driving the display device to display the image, the image displayed on the display device comprises a first image displayed under a full-screen display mode corresponding to the first computer and a second image corresponding to the control device, the first image remains in the full-screen display mode, and the second image is stacked on the first image;
    wherein when the first computer is triggered by the hotkey, the control device is linked to the second computer through the multiplexer, the first image corresponding to the first computer is a background image, and the second image corresponding to the control device is a control interface image; and wherein when the first computer is triggered by the hotkey, the first processor generates a notification signal to the second computer and the display device, after the notification signal is received by the second computer, the control interface image is generated by the second computer, the control interface image is transmitted and then displayed on the display device, and the control interface image is operated by the control device.

2. The display system of claim 1, wherein the second image is operated by the control device and the first image is not operated by the control device.

3. The display system of claim 1, wherein when the first computer generates a shutdown signal to the second computer, the second processor of the second computer turns off its power by executing the at least one second application program through the second software package.

4. The display system of claim 3, wherein the at least one second application program comprises an operating system (OS) shutdown application program.

5. The display system of claim 1, wherein the first image and the second image are displayed on the display device and continuously operated over time.

6. The display system of claim 1, wherein the display device comprises a chip module coupled to the first computer, and the chip module is driven by a chip application program of the at least one first application program.

7. The display system of claim 1, wherein the control device and/or the multiplexer is driven by a device control application program of the at least one first application program.

8. A display system capable of displaying a picture-to-picture image comprising:
 a computer comprising:
  a first processor;
  a second processor; and
  a first memory coupled to the first processor and the second processor, comprising:
   a first software package;
   a second software package;
   at least one first application program controlled by the first processor through the first software package; and
   at least one second application program controlled by the second processor through the second software package;
 a multiplexer coupled to the first processor and the second processor;
 a display device coupled to the computer and configured to display an image; and
 a control device coupled to the multiplexer;
 wherein when the computer is triggered by a hotkey, the first processor controls the at least one first application program and the multiplexer through the first software package so as to establish a link between the control device and the second processor through the multiplexer, the image displayed on the display device comprises a first image displayed under a full-screen mode and generated by the first processor and a second image generated by the second processor, the second image is a control interface image, the first image remains in the full-screen display mode, and the control interface image is stacked on the first image; and wherein when the computer is triggered by the hotkey, the first processor generates a notification signal to the second processor and the display device, after the notification signal is received by the second processor, the control interface image is generated by the second processor, the control interface image is then displayed on the display device, and the control interface image is operated by the control device.

9. The display system of claim 8, wherein media parameters displayed on the second image are controlled by the control device and the first image is not controlled by the control device.

10. The display system of claim 8, wherein the first image is a background image.

11. The display system of claim 8, wherein the first image and the second image are displayed on the display device and continuously operated over time.

12. The display system of claim 8, wherein when the first processor generates a shutdown signal to the second processor, the second processor is turned off by using the at least one second application program through the second software package.

13. The display system of claim 8, wherein the display device comprises a chip module coupled to the first processor and the second processor, and the chip module is driven by a chip application program of the at least one first application program.

14. A display system capable of displaying a picture-to-picture image comprising:
 a first computer comprising:
  a first processor; and
  a first image generator coupled to the first processor and configured to generate a first image;
 a second computer comprising:
  a second processor; and
  a second image generator coupled to the second processor and configured to generate a second image;
 a display device coupled to the first computer and the second computer; and
 a control device coupled to the first computer through a multiplexer;
 wherein the display device initially displays the first image, after the first computer is triggered by a hotkey, the first computer controls the multiplexer to establish a link between the control device and the second computer, the display device displays the first image under a full-screen mode and the second image simultaneously, the second image is a control interface image, the first image remains in the full-screen display mode, and the control interface image is stacked on the first image, the second computer operates the second image through the control device and generates a control signal to the first computer accordingly, and the first computer controls the display device according to the control signal; and
 wherein when the first computer is triggered by the hotkey, the first processor generates a notification signal to the second processor and the display device, after the notification signal is received by the second processor, the control interface image is generated by the second processor, the control interface image is then displayed on the display device, and the control interface image is operated by the control device.

15. The display system of claim 14, wherein the first computer further comprises a memory coupled to the first processor, the memory comprises a first driving application program, the first computer controls the multiplexer to establish the link between the control device and the second computer by using the first driving application program after the first computer is triggered by a hotkey.

16. The display system of claim 14, wherein the first computer further comprises a memory coupled to the first processor, the memory comprises a second driving application program, the second image is a control interface image, the second image is stacked on the first image, and the control signal is transmitted from the second computer to the first computer for enabling the first processor to drive the display device by using the second driving application program after the first computer is triggered by a hotkey.

17. The display system of claim 16, wherein at least one audio/video output configuration of the display device is adjusted by using the second driving application program according to the control signal.

* * * * *